United States Patent
Sergeev et al.

(10) Patent No.: US 10,747,724 B2
(45) Date of Patent: Aug. 18, 2020

(54) SYSTEM AND METHOD OF USING DATA BLOCKS TO OPTIMIZE FILE STORAGE

(71) Applicant: Acronis International GmbH, Schaffhausen (CH)

(72) Inventors: Alexei Sergeev, Moscow (RU); Alexander Khalyapin, Moscow (RU); Mark Shmulevich, Moscow (RU); Stanislav Protasov, Moscow (RU); Serguei M. Beloussov, Costa del Sol (SG)

(73) Assignee: ACRONIS INTERNATIONAL GMBH, Schaffhausen (CH)

( * ) Notice: Subject to any disclaimer, the term of this patent is extended or adjusted under 35 U.S.C. 154(b) by 374 days.

(21) Appl. No.: 15/846,308

(22) Filed: Dec. 19, 2017

(65) Prior Publication Data

US 2018/0121459 A1    May 3, 2018

Related U.S. Application Data

(63) Continuation of application No. 14/987,159, filed on Jan. 4, 2016, now Pat. No. 9,870,367.

(51) Int. Cl.
| | | |
|---|---|---|
| *G06F 17/00* | (2019.01) | |
| *G06F 16/174* | (2019.01) | |
| *G06F 16/22* | (2019.01) | |
| *G06F 16/16* | (2019.01) | |

(52) U.S. Cl.
CPC ........ *G06F 16/1744* (2019.01); *G06F 16/162* (2019.01); *G06F 16/22* (2019.01)

(58) Field of Classification Search
CPC .................................................... G06F 16/162
See application file for complete search history.

(56) References Cited

U.S. PATENT DOCUMENTS

| | | | | |
|---|---|---|---|---|
| 5,926,821 A | * | 7/1999 | Hirose | G06F 3/0619 |
| 2003/0191745 A1 | * | 10/2003 | Jiang | G06F 16/10 |
| 2010/0191779 A1 | * | 7/2010 | Hinrichs | G06F 3/0605 |
| | | | | 707/822 |
| 2012/0226869 A1 | * | 9/2012 | Kirihata | H04L 67/06 |
| | | | | 711/129 |
| 2013/0268499 A1 | * | 10/2013 | Kirihata | G06F 16/1748 |
| | | | | 707/692 |
| 2014/0149794 A1 | * | 5/2014 | Shetty | H04L 67/1095 |
| | | | | 714/20 |

(Continued)

*Primary Examiner* — Hung Q Pham
(74) *Attorney, Agent, or Firm* — Arent Fox LLP; Michael Fainberg

(57) ABSTRACT

A system and method is disclosed for using data blocks to optimize file storage in electronic data storage. An example method includes storing data objects in a storage service that correspond to a main block and multiple secondary blocks. The main block is stored in a first bucket and the secondary blocks are stored in one or more second buckets, with the main block including metadata indicating a unique identifier of the second bucket. The method further includes receiving a request to delete the data file to free storage; marking the main block of the data file for deletion that prevents a reading operation or a writing operation of additional data to the data file; deleting the secondary blocks of the data file; and after the secondary blocks are deleted, deleting the marked main block of the data file.

24 Claims, 9 Drawing Sheets

(56) References Cited

U.S. PATENT DOCUMENTS

| | | | |
|---|---|---|---|
| 2014/0173226 A1* | 6/2014 | Gold .................... | G06F 3/06 711/159 |
| 2016/0063018 A1* | 3/2016 | Das .................... | G06F 16/1752 707/822 |

* cited by examiner

SYSTEM AND METHOD OF USING DATA BLOCKS TO OPTIMIZE FILE STORAGE

CROSS REFERENCE TO RELATED APPLICATIONS

This application is a continuation of U.S. patent application Ser. No. 14/987,159, filed Jan. 4, 2016, entitled "System and Method of Using Data Blocks to Optimize File Storage", the entire contents of which are hereby incorporated by reference in their entirety.

FIELD OF TECHNOLOGY

The present disclosure generally relates to the field of electronic data storage, and, more specifically, to a system and method for using data blocks to optimize file storage in electronic data storage.

BACKGROUND

As the number of applications and services provided over the Internet continues to increase, the amount of electronic content, applications and services used by individuals, enterprises, and the like also continues to rise significantly. As a result, these entities are turning to cloud computing to manage this content and data storage. In general, cloud computing, also known as on-demand computing, is a kind of Internet-based computing in which shared resources and information is provided to computers and other devices on-demand. Cloud computing is a model for enabling ubiquitous, on-demand access to a shared pool of configurable computing resources, where the hardware and/or software used to support the data services is dynamically scalable to meet the needs of the services at any given time.

Cloud computing and storage solutions provide users and enterprises with various capabilities to store and process their data content in third-party data centers. Cloud computing relies on sharing of resources to achieve coherence and economies of scale. A user, enterprise or other customer will typically rent, lease, or otherwise pay for access to resources through the cloud, such that the entity does not have to purchase and maintain the hardware and/or software to provide access to these resources.

Accordingly, the development of cloud computing and the ability to purchase both services and capacity from multiple cloud providers has provided a useful secondary storage system that can be utilized by users and enterprises to store and manage data content. However, because the costs of data storage is directly proportional to the amount of data being stored, there remains a need to provide a more efficient and space-saving technique for storing data content, especially with remote data storage services, such as these cloud computing services.

SUMMARY

Thus, the present disclosure provides an effective solution for the foregoing problems by using data blocks to optimize file storage in electronic data storage. Disclosed are example systems, methods and computer program products for performing the improved data storage and management techniques described herein.

In one aspect, an exemplary method is disclosed for storing electronic data. According to the aspect, the method includes performing, by a processor, a sparse operation of a data file containing the electronic data to determine at least one region of the data file that contains unused space, where the data file comprises a plurality of blocks having a defined size; determining, by the processor, at least one block of the plurality of blocks that is overlapped by the at least one region of the data file that contains unused space; removing, by the processor, the at least block from the data file if the at least one block is overlapped by the at least one region of the data file that contains unused space; and storing the data file in an electronic database.

According to another aspect, the method includes creating the data file, where the data file comprises a main block and a plurality of secondary blocks, and the main block includes metadata indicating respective locations of the plurality of secondary blocks relative to the main block.

According to another aspect, the method includes deleting the data file from the electronic database by marking, by the processor, the main block of the data file for deletion, where the marking provide an indicator in the metadata to prevent at least one of a reading operation of the data file and a writing operation of additional data to the file; deleting, by the processor, the plurality of secondary blocks from the electronic database; and deleting, by the processor, the marked main block of the data file from the electronic database.

According to another aspect, the method includes renaming the data file in the electronic database by locking, by the processor, the main block of the data file by providing an indicator in the metadata of the main block to prevent at least one of a reading operation of the data file and a writing operation of additional data to the file; creating, by the processor, a copy of the main block of the data file and saving the copy to the electronic database with metadata of the copy of the main block including a new name of the data file; and deleting, by the processor, the locked main block of the data file.

According to another aspect, the method includes locking of the main block of the data file comprises accessing, by the processor, the metadata of the main block of the data file; deserializing, by the processor, the accessed metadata; and refreshing, by the processor, the metadata of the main block of the data file with the refreshed metadata including a data identifier that indicates a lock type and a lock time expiration.

According to another aspect, the method includes generating, by the processor, additional metadata indicating a location of the removed block in the data file; storing, by the processor, the additional metadata in the main block of the data file; and writing, by the processor, a plurality of zeroes in a data buffer of a client computer that correspond to a position of the removed at least one block when the client computer performs a read operation of the data file.

According to another aspect, the method includes writing, by the processor, additional electronic data to the data file, wherein the writing includes placing a last block of the data file in a buffer, appending the additional electronic data in the last block and storing the appending last block of the data file in the electronic database.

According to another aspect, if a size of the additional electronic data exceeds available space of the defined size of the last block of the data file, the method includes creating a new block and writing at least a portion of the additional electronic data to the new block of the data file.

In another aspect, a system is disclosed for storing electronic data. In this aspect, the system includes an electronic memory; and a processor configured to perform a sparse operation of a data file containing the electronic data to determine at least one region of the data file that contains unused space, where the data file comprises a plurality of blocks having a defined size, determine at least one block of the plurality of blocks that is overlapped by the at least one region of the data file that contains unused space, remove the at least block from the data file if the at least one block is overlapped by the at least one region of the data file that contains unused space, and storing the data file in the electronic database.

In another aspect, a non-transitory computer readable medium storing computer executable instructions for storing electronic data, where the instructions provide for performing, by a processor, a sparse operation of a data file containing the electronic data to determine at least one region of the data file that contains unused space, where the data file comprises a plurality of blocks having a defined size; determining, by the processor, at least one block of the plurality of blocks that is overlapped by the at least one region of the data file that contains unused space; removing, by the processor, the at least block from the data file if the at least one block is overlapped by the at least one region of the data file that contains unused space; and storing the data file in an electronic database.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
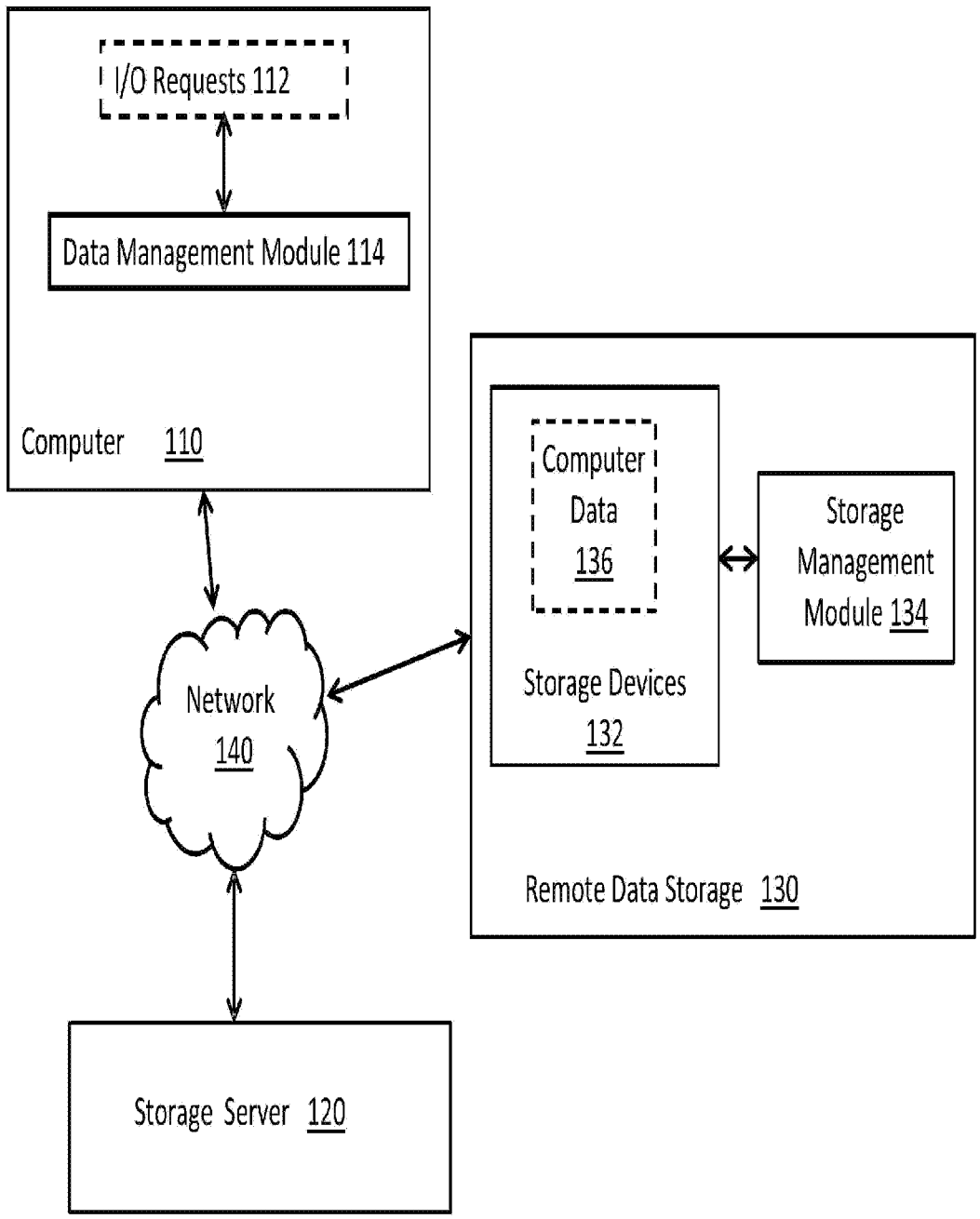
FIG. 1 illustrates a block diagram of a system for optimizing file storage and management according to an exemplary aspect.

Various aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a simplified summary of one or more aspects in order to provide a basic understanding of the aspects. This summary is not an extensive overview of all contemplated aspects, and is not intended to identify key or critical elements of all aspects nor delineate the scope of any or all aspects.

As described herein, a method and system is disclosed for managing aspects of data storage on a file storage system, such as an online/remote file storage service or cloud computing service. Examples of such services include Amazon® Simple Storage Service ("S3"), and Microsoft® Azure ("Azure"). As will be appreciated herein, the method and system provides an efficient mechanism for creating and managing data files, which can allow individuals and organizations to limit, at least to some extent, the increase of data storage costs.

In general, companies such as Microsoft® and Amazon® set up networks and infrastructure to provide one or more multi-client services (such as various types of cloud-based storage) that are accessible via the Internet and/or other networks to a distributed set of clients in a company, organization or the like. These data storage companies will herein be referred to as storage service providers. Moreover, the infrastructure provided for multi-client services is designed to implement application and/or data virtualization such that different client devices are provided isolated views of the services (i.e., the data files and the like), so that one client accessing the service or service functionality will not be aware that the same set of resources is also being accessed by another client. These storage service providers can include numerous data centers that can be distributed across many geographical locations and that host various resource pools, such as collections of physical and/or virtualized storage devices, computer servers, networking equipment and the like, needed to implement, configure and distribute the infrastructure and services offered by the storage service provider.

In view of the existing infrastructure described above, FIG. 1 illustrates a block diagram of a system 100 for optimizing file storage and management according to an exemplary aspect. As will be described in detail below, the system and method disclosed herein uses data blocks to optimize file storage for computer data in disk file systems and distributed file systems.

As generally shown, the system 100 includes a computer 110, a server 120, remote data storage 130, and network 140. It is contemplated that the server 120 and remote data storage 130 collectively form a storage service provider, which can be an online/remote file storage service, such S3 or Azure as described above. The remote data storage 130 can generally include hardware and software components configured to manage various storage resources within the computing environment. For example, the remote data storage 130 can include one or more data storage devices 132 (e.g., hard disk drives, optical drives, magnetic tape drives and/or the like) and storage management software (e.g., a storage management module 134) that provides an interface to the one or more data storage devices 132. The remote data storage 130 facilitates temporary and/or permanent storage of computer data, such as computer data 136. The computer data may be any type of electronic, digital data generated and/or stored by a computer. For example, the computer data 136 can represent text data, executable program code, audio, video or image data, or any other type of digital data.

The specific algorithms for storing the computer data 136 will be described in detail below, but generally compose files that are each stored as a collection of separately named blocks. Furthermore, the server 120 can be any type of computing device as known to those skilled in the art that is capable of cooperating with the remote data storage 130 to execute file system operations on the computer data 136. It should be appreciated that while server 120 and remote data storage 130 are described as forming an online/remote file storage service (e.g., a cloud computing service), these components can be incorporated into a local area network or the like as should be appreciated to those skilled in the art.

As further shown, the computer 110 is capable of communicating with the storage service provider via network 140. According to the exemplary aspect, the computer 110 may be any type of computing device, such as a laptop, a desktop, a Personal Digital Assistant (PDA), a tablet, a mobile phone and the like. The specific details of the exemplary computer 110 will be described below with respect to FIG. 8. However, as generally shown in FIG. 1, the computer 110 includes input/output requests 112 as well as multiple software applications, including data management module 114.

According to one aspect, the data management module 114 includes software code (e.g., processor executable instructions) in memory, which may be configured to execute/facilitate the input/output requests 112 into a plurality of file system operations that optimize file storage for computer data. For example, the computer 110 can include a computer-processing unit ("CPU") for executing the data management module 114 to determine one or more file system operations that create and manage computer files of computer data according to an exemplary aspect. It should be appreciated that while the exemplary aspect of FIG. 1 illustrates that computer 110 includes the data management module 114 to create and manage data files as described herein, it is contemplated that data management module 114 can be implemented on server 120 according to an alternative aspect. In addition, while the exemplary algorithm disclosed herein are described as being executed primary by the data management module 114, it is noted that these functions can also be performed by the storage management module 134 located at the remote data storage 130 and/or in performed by a combination of the data management module 114 and the storage management module 134.

Optionally, the computer 110 can be delegated with the tasks of a file server that facilitates access and management to the computer data 136. For example, the computer data 136 can be organized as a distributed file system. Accordingly, the data management module 114 can generate one or more log directory records for execution on the computer data 136 and storage on disk, i.e., within the remote data storage 130 as discussed in more detail with respect to FIG. 2B. Alternatively, the server 120 can cooperate with the computer 110 to perform various storage operations that write the one or more log directory records on the remote data storage 130.

Furthermore, network 140 can be any network for communicating data and data operations and can include a communication system (not shown) that connects the various computers of the system by wire, cable, fiber optic, and/or wireless links facilitated by various types of well-known network elements, such as hubs, switches, routers, and the like. Network 140 may employ various well-known protocols to communicate information amongst the network resources. In one aspect, the network 140 can be part of the Internet or intranet using various communications infrastructure such as Ethernet, WiFi and the like.

Referring back to the computer 110, the input/output requests 112 can include information regarding one or more system calls, including file management functions such as create file, open file, close file, rename file, delete file, read data, write data and/or the like) associated with the computer data 136. According to one aspect, the one or more system calls may form a transaction. As such, the input/output requests 112 can include transactional and non-transactional storage and/or file system operations. Moreover, the input/output requests 112 can be a log file that is periodically copied (i.e., flush time) to the remote data storage 130 for the computer data 136. For example, the input/output requests 112 can be flushed from RAM to a hard disk (e.g., within the remote data storage 130).

Performance of each system call on the computer data 136 requires one or more storage space optimization to be decided and completed. According to the exemplary aspect, the data management module 114 is configured to perform one or more file system operations that optimize storage space based on the I/O requests 112. Execution of the file system operations on the computer data 136 updates the data and/or related metadata as will be described in more detail below.

As described above, the computer 110 includes a plurality of input/output requests 112 that facilitate a plurality of file system operations to optimize file storage for computer data. According to the exemplary aspect, these operations can include the creating and modifying of computer files that each include a plurality of blocks, the mapping of file names into the electronic storage (e.g., remote data storage 130), the selection of the location for the storage of the file blocks in the electronic storage, the removal of a file, the renaming of a file, and the locking of a file. Each of these operations is premised on the file structure according to the exemplary aspect in which each data file is composed of a plurality of discrete blocks the advantages of which will be readily apparent based on the description provided below. Each of these operations can be performed by the data management module 114 in computer 100, as generally described above.

Figure 2A:
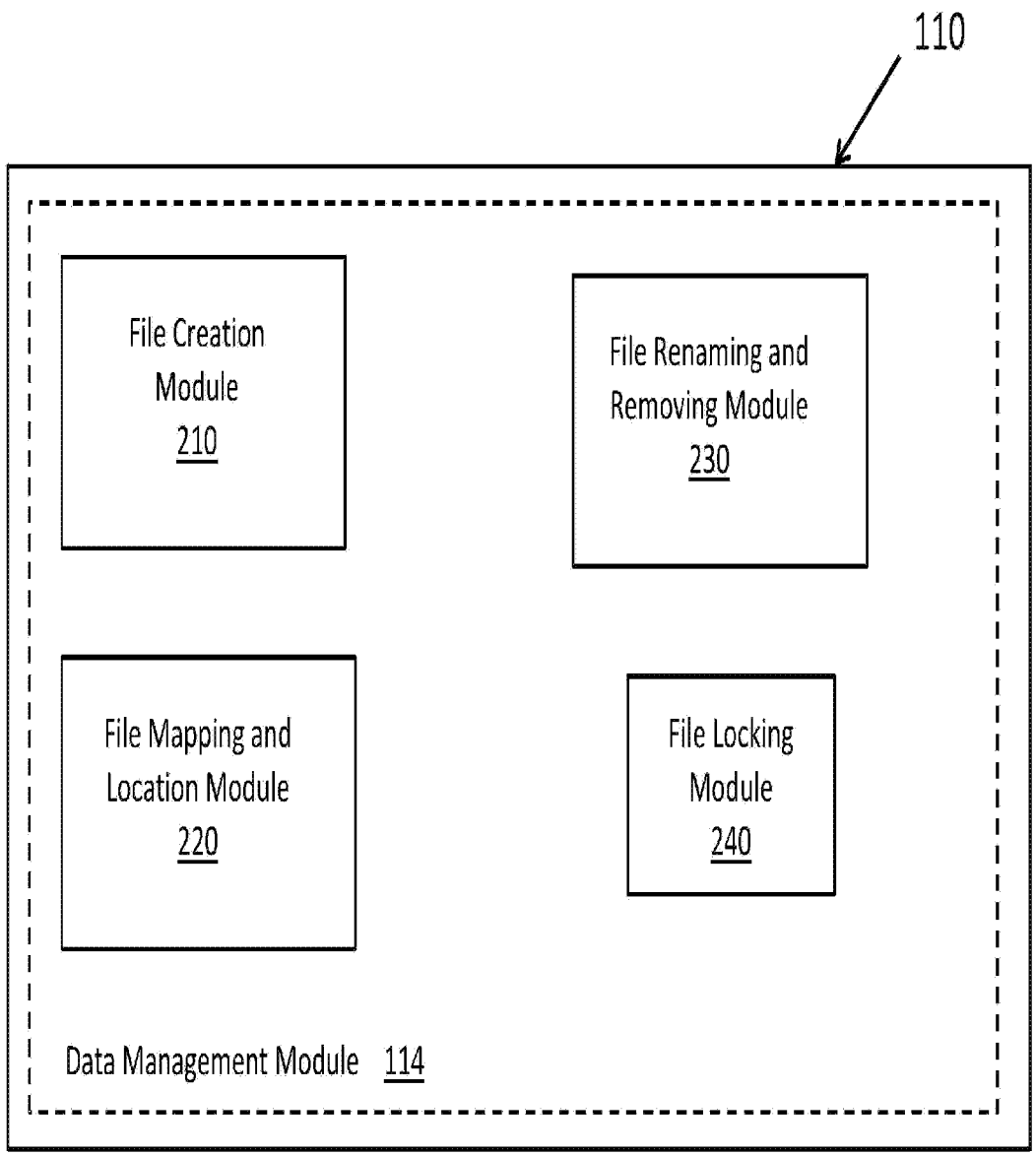
FIG. 2A illustrates a block diagram of a client computer for optimizing file storage and management according to an exemplary aspect.

FIG. 2A illustrates a block diagram of a client computer for optimizing file storage and management according to an exemplary aspect. In particular, the client computer shown in FIG. 2A illustrates a more detailed view of the client computer 110 of system 100 described above with respect to FIG. 1.

As noted above, the client computer 110 includes a data management module 114 that is configured to perform one or more file system operations that optimize storage space based on the I/O requests 112. According to the exemplary aspect shown in FIG. 2A, the data management module 114 can be composed of a plurality of modules. As used herein, the term "module" refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein.

As shown in FIG. 2A, the data management module 114 can include file creation module 210, file mapping and location module 220, file renaming and removing module 230, and file locking module 240. The operations or algorithms performed for each of these modules will be described in detail below. However, according to the exemplary aspect, the file creation module 210 is configured to perform the functions of creating one or more file of the computer data 136 and transmitting the file to electronic memory for storage, such as remote data storage 130. Furthermore, file mapping and location module 220 is configured to generate and transmit instructions to the electronic storage and/or storage service providers, with the instructions specifying the mapping and location of the file(s) in the electronic storage (e.g., the one or more data storage devices 132). In addition, file renaming and removing module 230 is configured to send instructions to the electronic storage and/or storage service providers to rename and/or delete files accordingly. Finally, file locking module 240 is provided to block certain actions requested by one or more client computers to be performed on a file. The specific I/O requests that require the locking operation will be described in more detail below, but generally, the locking operation prevents certain access to the file, such as reading and/or writing to the file.

Figure 2B:
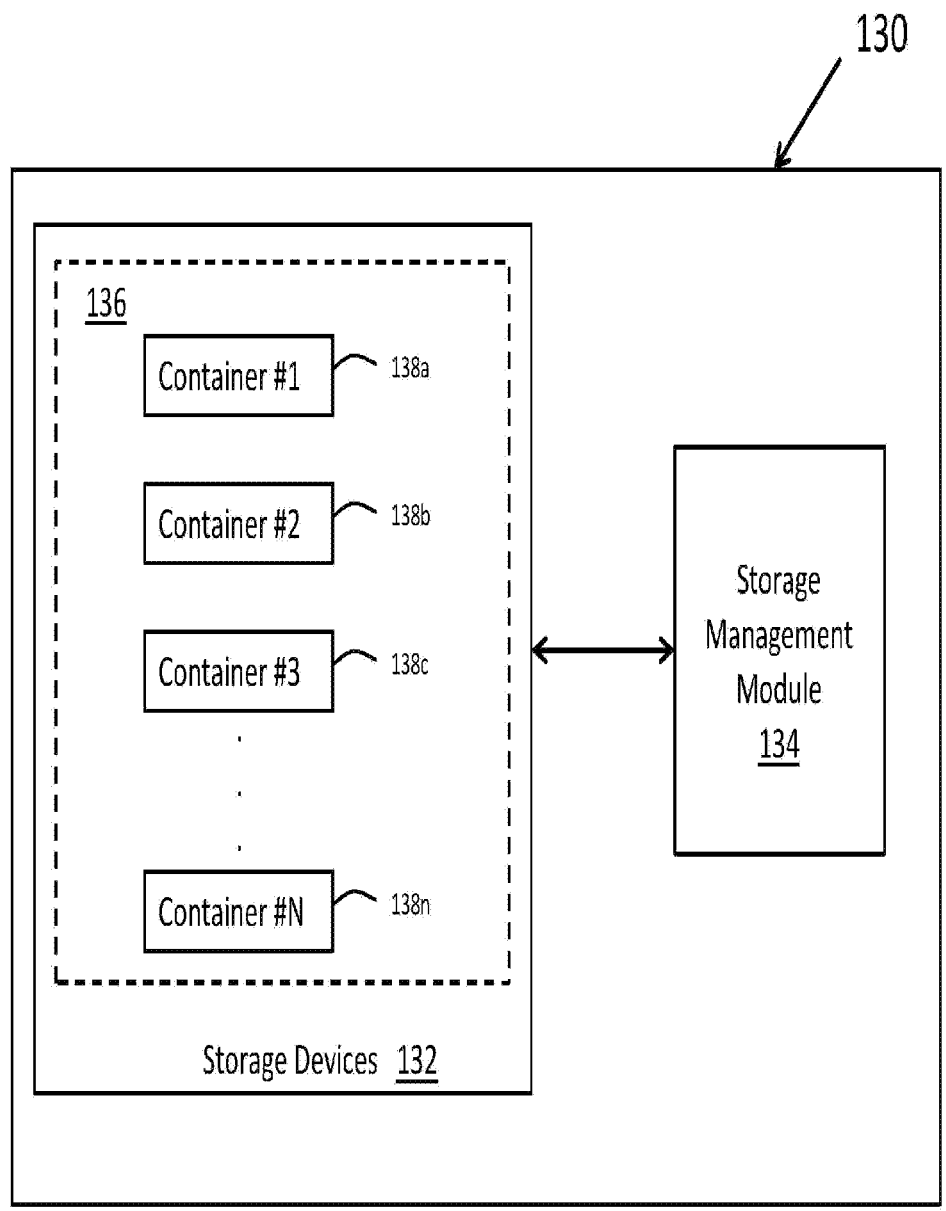
FIG. 2B illustrates a block diagram of a remote data storage system for optimizing file storage and management according to an exemplary aspect.

FIG. 2B illustrates a block diagram of a remote data storage system for optimizing file storage and management according to an exemplary aspect. In general, remote storage providers, such as S3 and Azure, provide "containers" or "buckets" to store data objects from a remote client computer or the like. Thus, as shown above in FIG. 2B, remote data storage 130, which can include a plurality of storage devices 132 as described above, can further include a number of containers 138a, 138b, 138c . . . 138n (alternatively, "buckets") to store computer data 136, such as data files 300. In general, a container can function as the root of an object namespace that is associated with a client computer using the remote storage service. Typically, storage service providers, such as Azure and S3, do not allow embedded containers to be created, but these providers do offer a mechanism of file mapping that imitates the traditional hierarchical structure of embedded directories and files. Thus, the containers can be considered to be analogous to a file system directory or folder. As further shown and described above, the remote data storage 130 can further include storage management module 134 that is capable of receiving instruction from the client computer 110 to store file(s) 300 as well as performing additional operations, such renaming, removing, locking and other operations and described herein.

Figure 3:
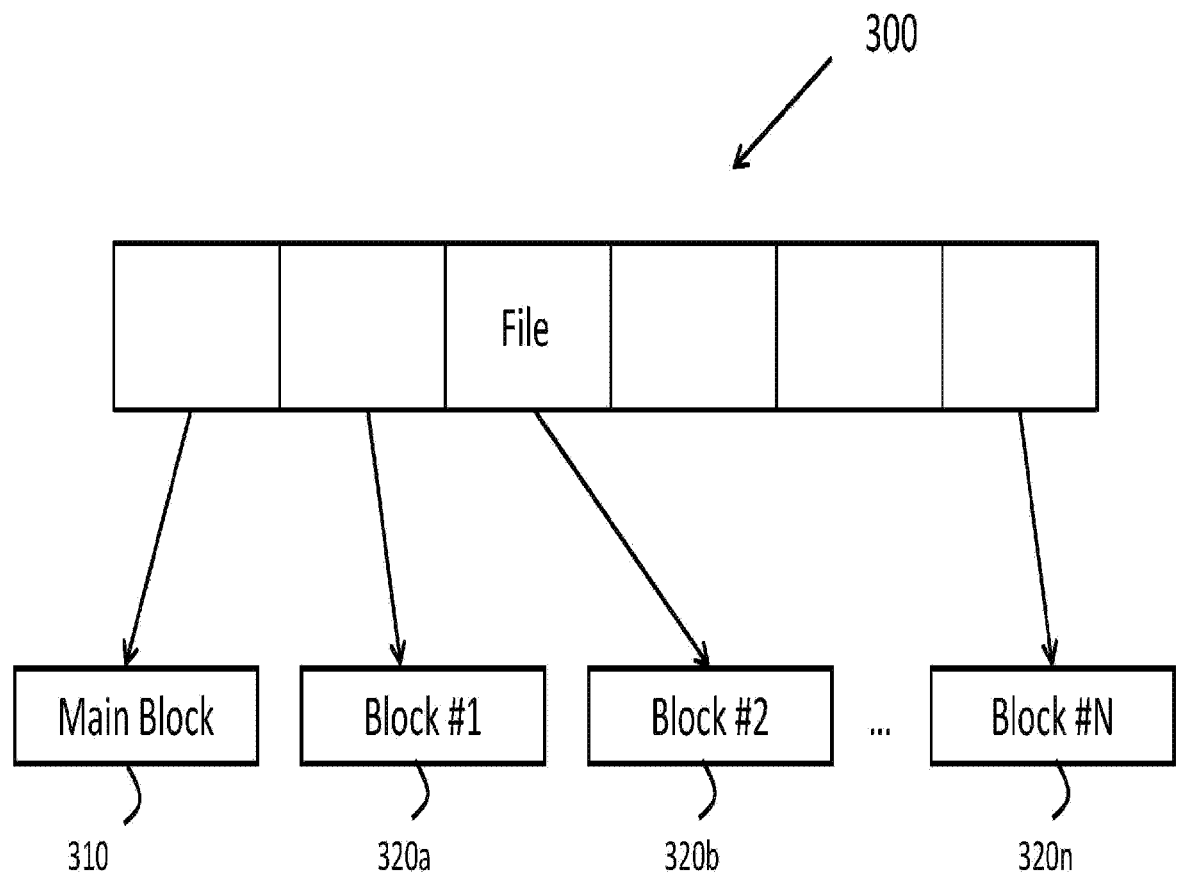
FIG. 3 illustrates a representative file created according to an exemplary aspect of the system and method described herein.

FIG. 3 illustrates a representative file 300 created according to an exemplary aspect of the system and method described herein. As shown, the contents of the file 300 can be created and/or saved in the form of a collection of separate blocks. More particularly, the file 300 can include a main block 310 and a number of subsequent blocks 320a, 320b . . . 320n. When the data management module 114 creates the file 300, each of the blocks can be separately named with the first (main) block 310 being the file name in the file system and the subsequent blocks containing in their name a coded offset relative to the start of the file 300. Moreover, according to an exemplary aspect, each of the blocks except the last block (i.e., blocks 320a to 320n−1) is saved with each block having a fixed size, and, more preferably, each block having the same fixed size. When the data management module 114, and, more particularly, the file creation module 210, is writing data to the end of the file 300 (as an append, for example), the last block (i.e., block 320n) is placed in a buffer, appended, and loaded back into the electronic storage (e.g., remote data storage 130) as part of the file 300. If the writing of data to the last block 320n results (or would result) in a block size that exceeds the fixed size of the block, then data is written to the entire block (i.e., block 320n) and a new block 320n+1 is created for the additional data that would otherwise exceed the fixed block size of block 320n. Further, the block size for each block or for a given region of the file 300 (e.g., a plurality of blocks) is saved as metadata in the main block 310. Thus, the main block 310 contains the metadata for the group of these sizes with an indication of the current file regions.

According to one refinement of the exemplary aspect, both the logical size and physical size of the file 300 are saved in the metadata of the main block 310 and can be refreshed upon writing to the main block 310 (if there are no other blocks) or by a flush operation. However, in certain circumstances, blocks may be larger than the boundary of the logical file size upon interruption of the writing process, for example, if the data has been written to the file, but not followed by a flush operation. In this instance, the content beyond the file boundary will not be accessible in a subsequent reading since such a request will typically indicate the name of the block or object key and the range of data. Moreover, the size of the requested range is dictated by the logical size of the file, and not the actual size of the block. To address this inconsistency, the disclosed system and method provides a corrective measure during the next opening of the file by using a locking operation, which will be discussed in greater detail below. In general, the data management module 114 can perform locking operation by placing a block of the file 300 before writing data to the file 300 and then, upon opening the file 300 once again when the timeout of the lock is detected the unfinished blocks can be removed or, on the other hand, the file size can be updated.

According to a further aspect described herein, the data management module 114 is configured to perform a sparse operation to remove blocks of the file 300 that fall entirely within a sparse region, i.e., unused space that does not contain real computer data necessary to perform data operations on the file. According to certain aspects, examples of unused space include removed backups or item (file) versions from an archive or the like. These backups/versions and the respective data are unclaimed later and not referenced or used during a file operation. As a result, the archive file regions containing such item(s), data and metadata can be removed to save physical space. Thus, according to an exemplary aspect, a sparse algorithm is a very efficient mechanism for removing regions that may be placed in a middle of an archive file.

If a portion of such a removed block is required upon reading data from the file 300, the data management module 114 is configured to write zeroes into the corresponding portion of the buffer. Furthermore, if the sparse region includes a block with zero offset (i.e., the main block 310 containing the file name and other metadata), then this block is not removed, but replaced by a new block, containing the same metadata, but data of zero size. Advantageously, the system and method reduces the total volume (i.e., the physical size) of the data to be stored, but logically provides a file of the same size as before removal of the unused block.

Figure 4:
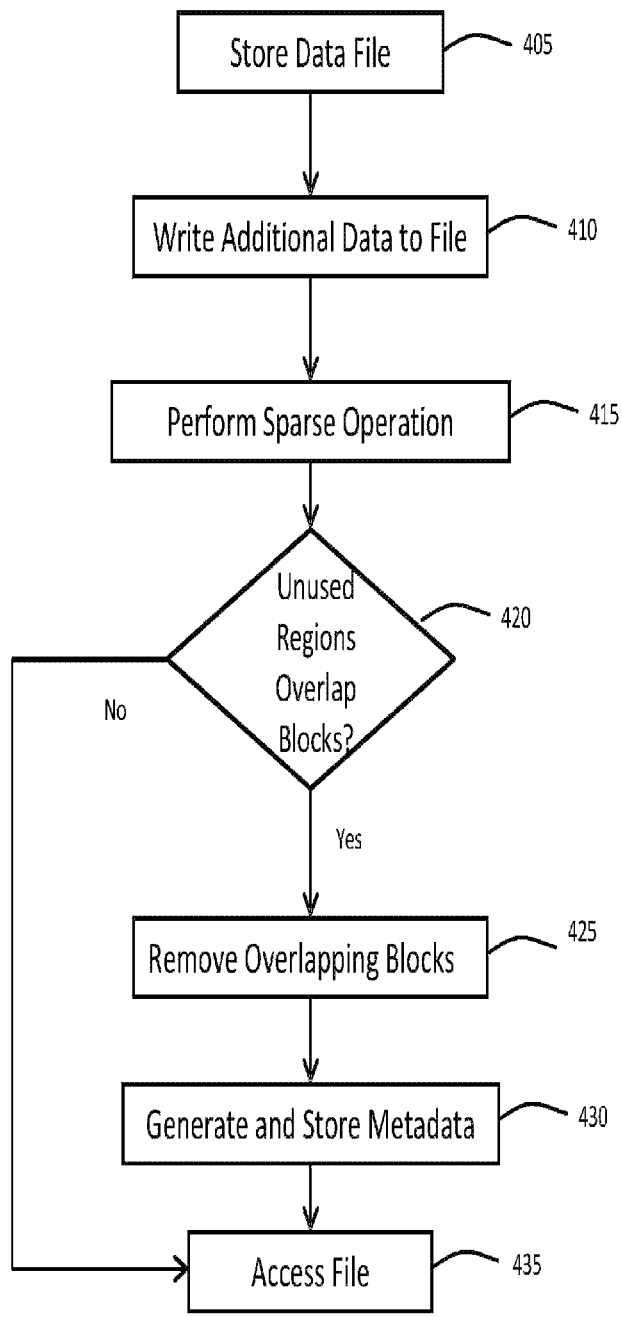
FIG. 4 illustrates a flowchart for a method of writing and reading a computer file according to an exemplary aspect.

FIG. 4 illustrates a method 400 of writing and reading a computer file according to an exemplary aspect. The method or algorithm shown in FIG. 4 can be executed by the data management module 114, and, more particularly, by the file creation module 210 according to an exemplary aspect. Initially, as shown as Step 405, a file (e.g., file 300 of FIG. 3) is stored in electronic memory (e.g., remote data storage 130) that contains a main block and a plurality of subsequent blocks. As described above, the creation of the electronic file 300 can be performed as an I/O request 112 by the data management module 114 of the computer 110 shown in FIG. 1. Next, at Step 410, the data management module 114 can write additional data to file 300 after it has been created. As described above, data is written to the last block (i.e., block 320n) of the file 300, which is placed in a buffer, appended, and loaded back into the electronic storage (e.g., remote data storage 130) as part of the file 300. It should be appreciated that Step 410 of writing additional data to file 300 is an optional step that is not required for the primary aspect of writing and reading files containing a plurality of blocks as described herein.

As further shown, at Step 415, a sparse operation is performed to determine those portions of the data in the file 300 that are no longer used, i.e., that do not contain actual data. Sparse operations are generally well known to those skilled in the art, but involve an algorithm to analyze the file 300 to determine portions of the file that contain "unused" regions. If it is determined that the file 300 contains such unused space, the system then determines at Step 420 whether the unused regions overlap entire blocks of file 300. If the file 300 does not contain any blocks that are overlapped by unused regions, the file creation and storage is complete and the method proceeds to Step 435 as discussed below in which the file 300 can be created. Alternatively, the algorithm shown in FIG. 4 could return to Step 410 where additional data is written to file 300. This return loop is not shown in the aspect shown in FIG. 4. However, in this instance, the algorithm will again perform the sparse operation at Step 415 since the unused regions of file 300 can change as data is continuously appended to the file during Step 410.

If so, the method proceeds to Step 425 where blocks that completely contain only unused space are removed from the file 300. In this instance, metadata is created indicating the location of the block relative to the main block 310 (i.e., the offset described above) of which the metadata can be stored therein (Step 430). Finally, the file can be accessed and read by computer 110 at Step 435. In particular, when the file is read, the metadata contained in main block 310 indicates the position of the sparse block that has been removed from file 300. When the file 300 is read, the data management module 114 creates a virtual block filled with zeros to represent the prior unused block that has been removed. As one skilled in the art will appreciate, such remove of unused or sparse blocks frees up additional space in the electronic memory (e.g., remote data storage 130). According to an alternative aspect, the method can consider inexistent blocks as sparsed. In other words, any block that is inexistent is considered to be sparsed, irrespective of the reason to the absence of such block. In this instance, the main block 310 does not need to store metadata relating to the position of the sparse block that has been removed from file 300. Moreover, in circumstances of append-only data files (e.g., data archives), this aspect would optimize performance and efficiency of the described method.

According to one aspect, the data management module 114 is further configured to perform the instructions for storing the computer data 136 as files 300 in remote data storage 130, and, more particularly, to assign URLs to each block in the storage. According to one aspect, these functions are executed by the file mapping and location module 220. According to this aspect, the URL serves as codes for the address of storage where the blocks are located and the name of the container (or bucket). For example, according to the exemplary aspect, a special character is indicated in the name of the object, which is interpreted as a separator of the path to the file 300 in the container. Then, in the request to the file in the remote data storage 130, the data management module 114 can ask for a listing of the names of only those objects that begin with a certain prefix, but do not contain a separator after this prefix.

According to one exemplary aspect, the data management module 114 can instruct the file to be saved in the container of the remote data storage 130 using the forward slash "/" as the separator. Thus, for example, when the data management module 114 requests a listing of objects with the prefix "dir1/dir2/" and the separator is "/", the remote data storage 130 will return the results containing the names "dir1/dir2/file1", "dir1/dir2/fileN", and "dir1/dir2/dir3/". However, the remote data storage 130 will not return the names "dir1/other_dir/some_file" or "dir1/dir2/dir3/too deep file" as these files do not fit the requested criteria.

Advantageously, such a support by the remote data storage 130 makes it possible to provide a traditional hierarchical structure in a file API. The name of the first directory (e.g., "dir1") is the name of the container or bucket at the remote data storage 130. The other directories are virtual entities. If a client such as computer 110 requires the creation of a file with a long hierarchical path, the main block (e.g., block 310) will be created with the indicated name, but the creation of all higher virtual directories is done automatically. According to one aspect, when all files containing a directory are with an identical prefix are removed, the directory itself disappears.

According to one aspect, then a user of the client computer (e.g., computer 110 of FIG. 1) creates a file through the file API, the data management module 114 causes an unused object with the name of the directory to be created at the remote data storage 130. The user, upon listing the content of the parent directory created, will see his newly created directory, which would be the same view that would occur in the case of a traditional file storage system.

Although the main file block (e.g., block 310) of the created file 300 has the name indicated by the client upon creating the file 300, the subsequent blocks 320a, 320b . . . 320n of the file 300 should not be visible to the user accessing the container, unless the user is an administrator, for example. Since the number of blocks in a file may be very large, the blocks need to be stored along a path, such that the names of the blocks do not appear in the result of a listing of files during a request from the storage server, such as server 120. The system and method disclosed herein contemplates two ways to store the subsequent blocks 320a, 320b . . . 320n of a file 300, such that they are not visible to a user.

According to a first aspect, the server 120 causes the file blocks 320a, 320b . . . 320n to be stored in a separate container (or bucket) in the remote data storage 130 with a randomly generated identification (i.e., a GUID). For example, the main block 310 can be stored in container 138a while the secondary blocks, 320a, 302b, etc., can be stored in one or more of containers 138b, 138c . . . 138n, as shown in FIG. 2B. Furthermore, the GUID can be written into the metadata of the main block 310 of the file 300. In one aspect, the containers themselves can contain metadata related to the objects and files stored therein. Thus, according to this aspect, the metadata in the container can be indicated with the attribute hidden=1, which results in this directory being prevented from appearing when a user (not an administrator) is navigating along a tree of clients to view different files.

Alternatively, according to another aspect, the server 120 can cause the file blocks 320a, 320b . . . 320n to be stored in a virtual directory having a path to this directory being stored as metadata in the main block 310 of the file 300. Thus, when a user is navigating along a tree of clients to view different files, such service directories with the blocks of files 320a, 320b . . . 320n do not appear to the user. According to this aspect, the virtual directories can be placed in the same container as the main block 310 or a different container than main block 310. An example name for a file can be "subaccount_root/some_dir/_some_file". Thus, the blocks can have names such as "subaccount_root/reserved_name_for_file_chunks/guid ⅟10000"; "subaccount_root/reserved_name_for_file_chunks/guid ⅟2000" and so on.

Figure 5:
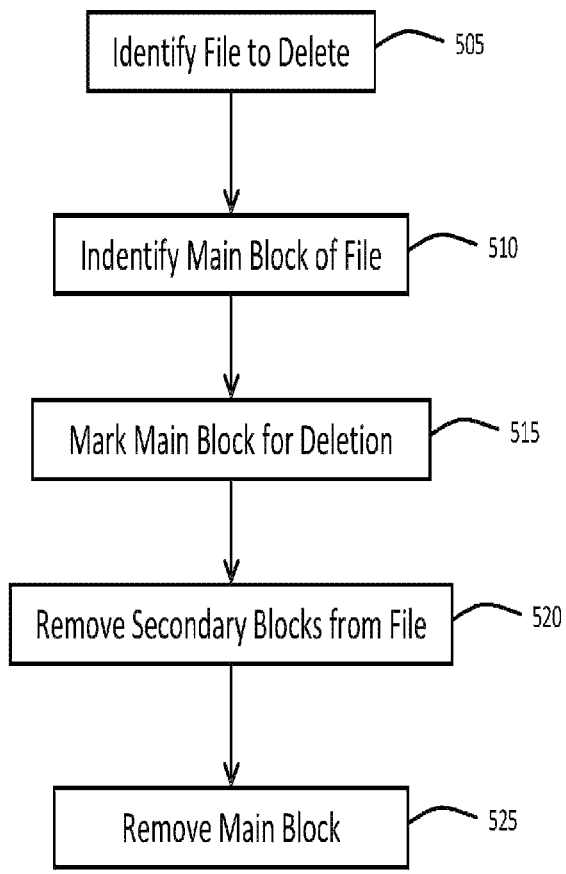
FIG. 5 illustrates a flowchart for a method for removing a file from the remote data storage according to an exemplary aspect.

As discussed above with respect to FIG. 1, one of the I/O requests 112 generated by the client computer 110 and carried out by the data management module 114 is the request to remove or delete a file 300 from the remote data storage 130. FIG. 5 illustrates a flowchart for a method for removing a file from the remote data storage according to an exemplary aspect. According to an exemplary aspect, the algorithm shown in FIG. 5 can be executed by the file renaming and removing module 230 illustrated in FIG. 2A.

As shown in FIG. 5, a user first identifies a file to be deleted using the computer API at Step 505. Next, at Step 510, the data management module 114 in conjunction with server 120 identifies the main block 310 of the file 300 to be exclusively locked. The locking operation will be discussed in more detail below with respect to FIG. 7, but an exclusive block operation entails prevent all users from reading and writing to the file 300. At Step 515, the main block 310 is then marked for removal. In particular, the size of the main block 310 is zeroed and the logical size of the main block 310 is also zeroed in metadata. Furthermore, a lock flag is set and a note is made as to the removal of the main block 310.

Once the main block 310 is marked for removal, the secondary or subsequent blocks 320a, 320b . . . 320n of the file 300 are removed at Step 520. In a first aspect, the server 120 of the storage service provider removes the container(s) in the remote data storage 130 containing the subsequent blocks 320a, 320b . . . 320n of the file 300 set to be removed. Alternatively, if these subsequent blocks are stored in a virtual directory as described above, the server 120 lists and removes each of the subsequent blocks 320a, 320b . . . 320n in either a single request or in batches of N blocks (e.g., for S3 the batches are N=1000). After these secondary blocks are removed, the main block 310 is then removed at Step 525.

According to one aspect, if the removal transaction is interrupted during the process shown in FIG. 5, the implementation of the client's API completes the removal of the file 300 the next time the marked filed is discovered (e.g., another client requests a transaction of the file 300).

Figure 6:
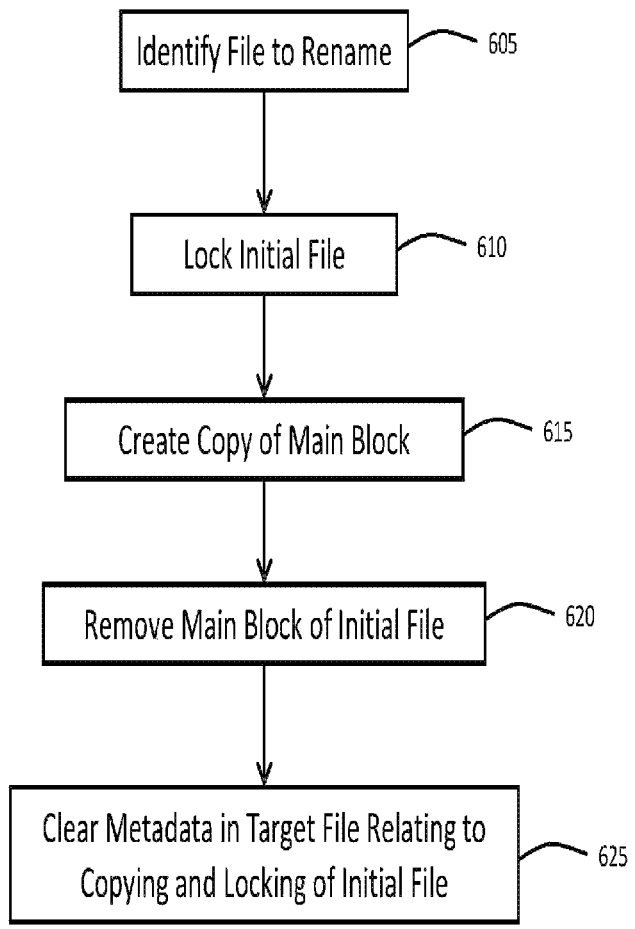
FIG. 6 illustrates a flowchart for a method for renaming a file in the remote data storage according to an exemplary aspect.

Another I/O requests 112 generated by the client computer 110 and carried out by the data management module 114 is the renaming of a file 300 in the remote data storage 130. FIG. 6 illustrates a flowchart for a method for renaming a file from the remote data storage according to an exemplary aspect. According to an exemplary aspect, the algorithm shown in FIG. 6 can also be executed by the file renaming and removing module 230 illustrated in FIG. 2A.

According to the exemplary aspect, the renaming of a file (e.g., file 300) is typically in response to a user request and carried out by the data management module 114 sending instructions via the client API to the storage service provider to perform the renaming. More particularly, the renaming of a file is done as a copying of the main block 310 of the file with a subsequent removal of the initial file 300. To avoid a situation where, due to an interruption of the transaction, two files are present and refer to the same directory with blocks, the renaming and removal of the initial file is performed in multiple stages.

As shown in FIG. 6, the method beings at Step 605 where the user identifies a file (e.g., file 300) located in the remote data storage 130 and provides a new name designation for the file 300. Next, the initial file 300 is locked at Step 610, according to the locking operation that will be described below, and marked as being copied to a target file. At Step 615, a copy of the main block 310 of the file 300 is created with the name of the target file as provided by the client computer (i.e., the user). According to one aspect, the source of the copying is indicated in the metadata. Thus, if such a file already exists, an error is returned and the initial file is returned to the starting state.

In any event, once the copy of the main block 310 is copied, the main block 310 with the name of the initial file 300 is removed from the container or bucket at Step 620. Then, at Step 625, the notes about the copying and the lock are removed from the main block 310 of the target file.

According to one aspect, if the renaming transaction illustrated in FIG. 6 is interrupted, when the initial or target file is subsequently encountered, depending on the cross references to each other in the metadata, the transaction is either completed or rolled back. For example, if the client computer 110 is attempting to rename file 300 from initial name "X" to target name "Y", upon interruption of the renaming transaction, the system and method may obtain the following results if Y exists and its Z.operationID==X.operationID, go to Step 615;

if Z exists, but with a different operationID or copyFrom, then if MetaX.chunks==MetaZ.chunks && MetaX.chunks!=0, the system and method removes the object having the older date of modification. Otherwise, the system and method clears copyFrom/copyTo and operationID from both.

As further described above, a locking operation can be performed to support certain I/O requests 112. In particular, the data management module 114, and more particularly, the file locking module 240 shown in FIG. 2A, is configured to execute a locking operation of the file 300 to facilitate certain secondary operations of the file 300, such as removing the file or renaming the file, for example. According to the exemplary aspect, the locking operation can be used to provide exclusive access to the file 300 and not allow any other files to be obtained. Moreover, the locking operation is provided to protect against writing to the file 300 that allows the owner to write to a file, but in parallel also allows another user to obtain a plurality of read locks. According to one aspect, read lock makes it possible to obtain only other read locks and a single write lock.

In general, online/remote file storage services, such as S3 and Azure discussed above, provide an option of a conditional refreshing of the metadata of the data files (e.g., the S3 objects and Azure blobs) by indicating an "If-Match" request in the header field of a write request to the data file. According to one exemplary aspect of the method and system described herein, the If-Match request in the header field can be used with the method to make it conditional. Thus, if the computer 110 has one or more entities previously obtained from the storage, the computer 110 can verify that one of those entities is current by including a list of the associated entity tags ("ETags") in the If-Match header field. For this purpose, in response to a reading/modification of a block of file 300, the server 320 can return the associated ETag that identifies the current state of the specific block to the computer 110. If a subsequent refreshing operation of the file 300 indicates that the "If-Match" request is equal to the previous ETag, and the computer 110 will determine that a parallel operation is already modifying the block of the file 300 and the request for the reading/modification of the file 300 will not be executed due to the conflict (e.g., HTTP error 409 conflict).

Figure 7:
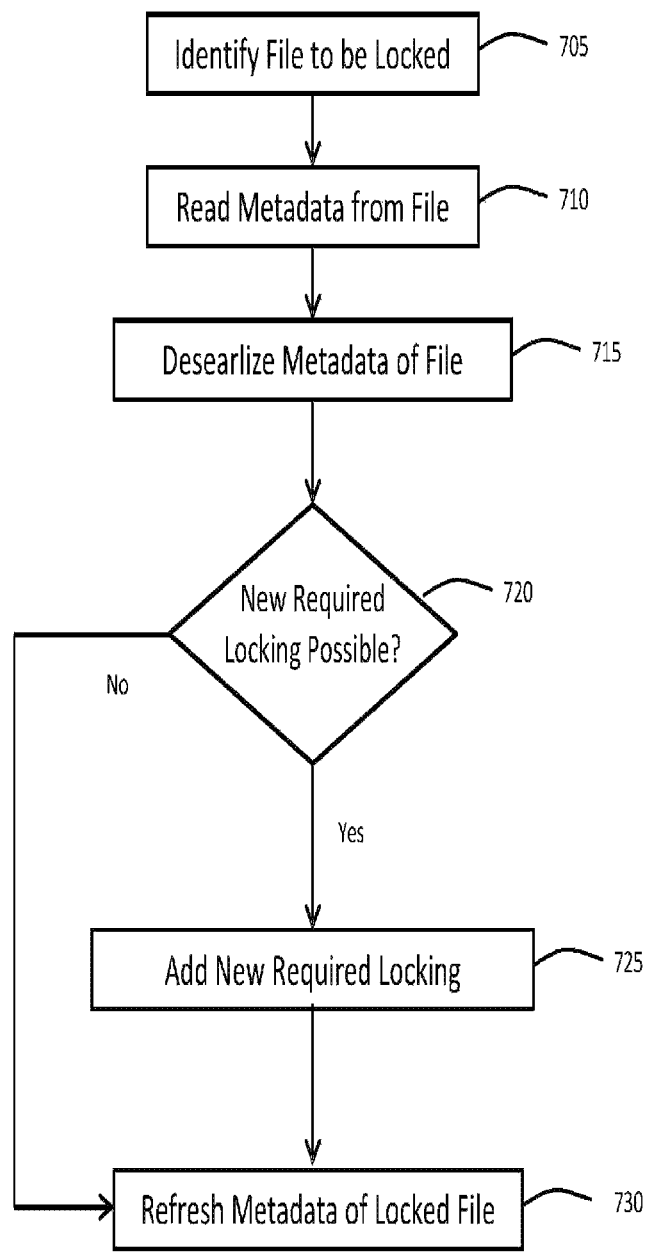
FIG. 7 illustrates a flowchart for an exemplary method of performing a locking operation of a file according to an exemplary aspect.

In view of the foregoing, FIG. 7 illustrates a flowchart for an exemplary method of performing a locking operation of a file according to an exemplary aspect. Initially, at Step 705, an existing file (e.g., file 300) stored in the remote data storage 130 is identified to be locked. According to one aspect, this step can be performed as an I/O request 112 by the API of the client computer 110, and more particularly, executed by the data management module 114. Next, at Step 710, the metadata is read from the main block 310 of the identified file 300. Once accessed, the metadata from the main block 310 is then deserialized with the lock identifiers at Step 715. Deserialization is the process translating the metadata from the state as stored in the main block 310 into a format of data structures or objects. According to one aspect, each lock record can contain a lock ID (e.g., a GUID), a lock level or type (e.g., a read, append, exclusive, or the like), and a lock renewing/creation timestamp. Lock operation metadata structures contain a list of read lock records, an append lock record and/or null and exclusive lock record or null. According to this aspect, all of this metadata structure is serialized as a byte array (e.g., BLOB) and stored as part of file metadata. Deserialization parses that BLOB and fills the structure.

At this point, the method determines at Step 720 whether it is possible to add a new required lock to the metadata. If it is not possible, the method proceeds to Step 730 as will be discussed below. However, if it is possible, the method proceeds to step 725 where the new required lock is added to the metadata. In general, the lock policy (or rules) is establish that an exclusive lock is not compliant with any other locks, an append lock can be set as only one per file (if there is no exclusive lock) and is compliant with one or more read locks, and any amount of read locks can be allowed if there is no exclusive lock. Thus, according to Step 725, if a requested or required lock is allowed, it can be added to the lock metadata structure (or renewed by adjusting of timestamp). Once the lock metadata structure is added to the metadata, the metadata is refreshed for the main block 310 at Step 725 (i.e., it is added back to the main block), indicating the new serialized value of the line with the locks. It should be appreciated that at this point, any time a client computer attempts to access the "locked" file 300 for performing a function, such as reading and writing data to the file, the metadata will of the file 300 stored in the main block 310 will indicate to the requesting client computer that the target file is locked for the particular request. Thus, the client computer will be effectively prevented from performing the requested action as would be understood to one skilled in the art.

According to an exemplary aspect of the method and system disclosed herein, the line with locks will contain unique identifiers of the locks, which identifies information including, but not limited to the time of lock expiration, the lock type (e.g., exclusive, read or write) and the like. According to one aspect, if a lock expires, then, when another client computer attempts to establish a new lock it is ignored and removed from the line. Thus, after establishing a lock according to the algorithm described above with respect to FIG. 7, the client computer 110 should periodically refresh the lock identifiers, including the lock expiration. For this operation, the file API begins a separate thread that performs the refreshing of lock identifiers at a given frequency (having/knowing the proper ID of the lock).

According to another exemplary aspect, in the event of a parallel successful locking operation requests on the part of several client computers (for example, one write request and several read requests), it is possible that collisions will arise upon refreshing the metadata in the main block 310 of the file 300 due to noncompliance of the ETag indicated in the If-Match request. In this case, one or more of the client computers will be forced to do a repeat reading of a new version of the metadata with a refreshed ETag. Preferably, the client computer's requested locking operation will not be removed from the list of requests, since the client computer will successfully refresh the time (unless too much time has passed). Furthermore, the expiration interval should be chosen in the order of minutes (perhaps dozens of minutes) so that the refresh time is not be very small, and the server 120 will not be overburdened with a large number of such requests. In general, it should be appreciated that parameters, such as the locking operation expiration time and the refresh rate, are specified according to the client's settings and transmitted to the storage service provider by the data management module 114.

According to one refinement of the exemplary aspect, a separate scenario arises when the client computer 110, for example, reads an object from an S3 storage service provider or a blob from an Azure storage service provide by placing the object or blob in the storage and bypassing the file API. In this case, if the client computer 110 determines that the main block 310 of the file 300 does not contain the required metadata specifying the location of the secondary blocks, the main block 310 is interpreted as a legacy file and can be read at will. If such a file requires an append, then the additional data can be appended to the file 300 using the algorithm illustrated in FIG. 4 and described above if the size of the additional data is less than the block size. Otherwise, the append goes to a block whose offset is equal to the initial file size, and whose size is such that the upper boundary is aligned with the defined block boundary. The other secondary blocks follow the general rule described above. Moreover, the main block 310 will contain all necessary metadata, including the block size. In this instance, the block coming after the main block 310 (e.g., block 320*a*) is addressed during reading by an offset that is defined as max (block-size, main-block-size).

Figure 8:
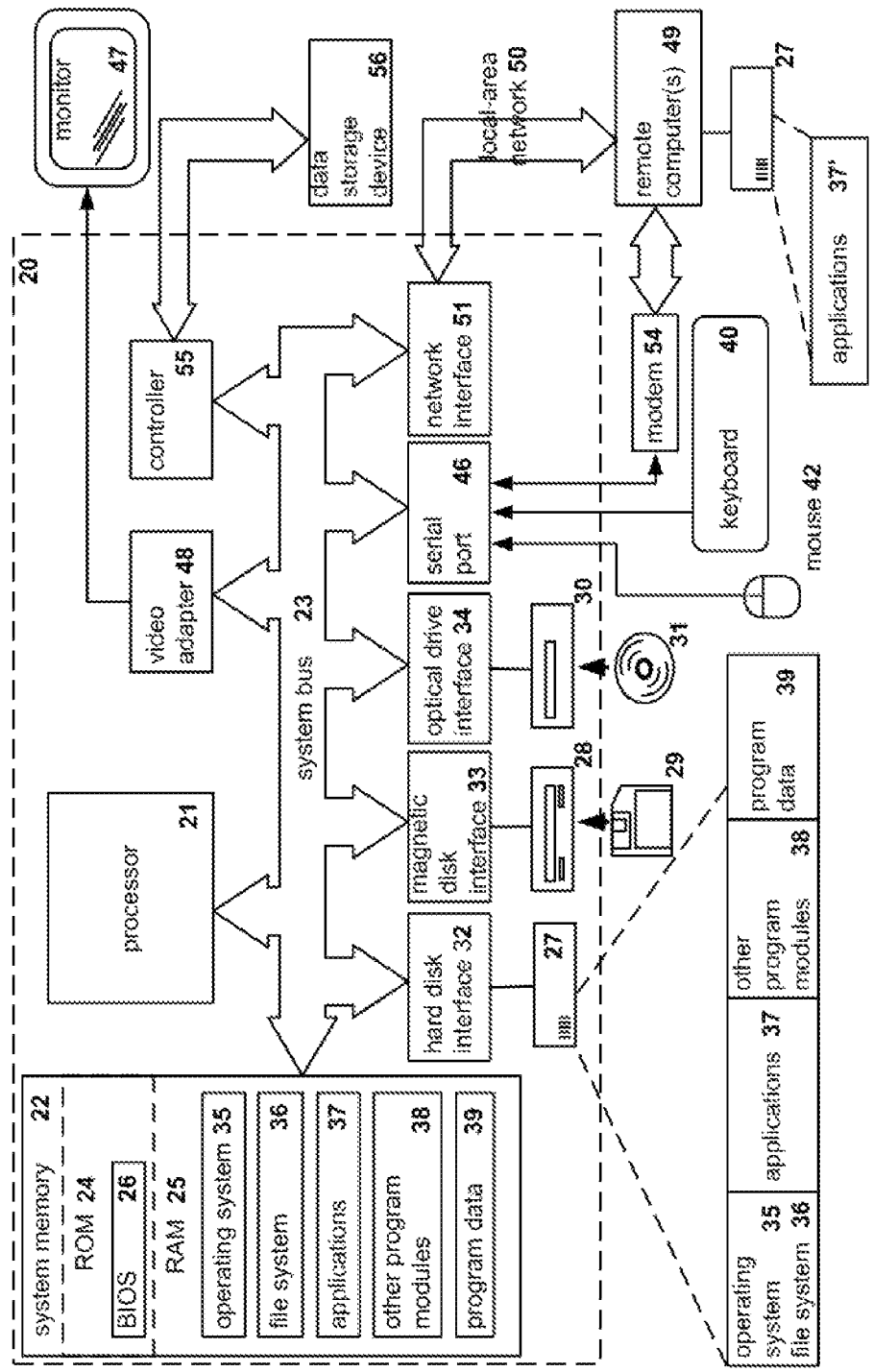
FIG. 8 illustrates an example of a general-purpose computer system on which the disclosed systems and method can be implemented.

Finally, FIG. 8 illustrates an example of a general-purpose computer system (which may be a personal computer or a server) on which the disclosed systems and method can be implemented according to an example aspect. It should be appreciated that the detailed general-purpose computer system can correspond to the computer 110 described above with respect to FIG. 1. Moreover, the remote computer(s) 49, as described below, can correspond to the remote data storage services discussed above with respect to the exemplary system and method.

As shown in FIG. 8, the computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20, as shown in FIG. 3. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for managing electronic data stored in a storage service, the method comprising:

storing in the storage service, by a processor, a plurality of data objects that correspond to a main block and a plurality of secondary blocks of a data file, wherein the main block is stored in a first bucket and has a name being a file name of the data file and the plurality of secondary blocks are stored in at least one second bucket, wherein the main block includes metadata indicating a unique identifier of the at least one second bucket and each secondary block contains a portion of the electronic data of the data file;

receiving, by the processor of the storage service, a request to delete the data file to free at least one storage location including the first bucket and the at least one second bucket;

based on the request to delete the data file, marking, by the processor, the main block of the data file for deletion by providing an indicator in the metadata of the main block that prevents at least one of a reading operation of the data file and a writing operation of additional data to the data file;

deleting, by the processor, the plurality of secondary blocks of the data file from the at least one second bucket; and after the plurality of secondary blocks are deleted, deleting, by the processor, the marked main block of the data file from the first bucket, such that the at least one storage location is free to store a new data file.

2. The method of claim 1, wherein the plurality of secondary blocks comprise names containing coded offsets relative to a start of the data file.

3. The method of claim 2, wherein the metadata included in the main block indicating the unique identifier corresponds to the coded offsets of the plurality of secondary blocks, respectively.

4. The method of claim 1, further comprising storing, by the processor, a new data file in the freed at least one storage location in the storage service where at least one of the main block and the plurality of secondary blocks was previous stored.

5. The method of claim 1, further comprising after the marking of the main block of the data file and before the deleting of the plurality of secondary blocks, creating by the processor, copies of the main block and the plurality of secondary blocks of the data file and saving, by the processor, the created copies as a new main block and new plurality of second blocks in another first bucket and another at least one second bucket, respectively, of the storage service.

6. The method of claim 5, wherein the marking of the main block for deletion comprises locking, by the processor, the main block by:
  accessing the metadata of the main block of the data file;
  deserializing the accessed metadata; and
  refreshing the metadata of the main block of the data file with the refreshed metadata including a data identifier that indicates a lock type and a lock time expiration.

7. The method of claim 1, further comprising writing, by the processor, a plurality of zeroes in a data buffer of a client computer that correspond to a position of the deleted data file the client computer attempts to perform a read operation of the data file.

8. The method of claim 1, wherein the first and second buckets comprise roots of object namespaces that are associated with a client computer using the storage service.

9. A system for managing electronic data stored in a storage service, the system comprising:

a processor configured to:
  store, in the storage service, a plurality of data objects that correspond to a main block and a plurality of secondary blocks of a data file, wherein the main block is stored in a first bucket and has a name being a file name of the data file and the plurality of secondary blocks are stored in at least one second bucket, wherein the main block includes metadata indicating a unique identifier of the at least one second bucket and each secondary block contains a portion of the electronic data of the data file,
  receive a request to delete the data file to free at least one storage location including the first bucket and the at least one second bucket,
  based on the request to delete the data file, mark the main block of the data file for deletion by providing an indicator in the metadata of the main block that prevents at least one of a reading operation of the data file and a writing operation of additional data to the data file,
  delete the plurality of secondary blocks of the data file from the at least one second bucket, and
  after the plurality of secondary blocks are deleted, delete the marked main block of the data file from the first bucket, such that the at least one storage location is free to store a new data file.

10. The system of claim 9, wherein the plurality of secondary blocks comprise names containing coded offsets relative to a start of the data file.

11. The system of claim 10, wherein the metadata included in the main block indicating the unique identifier corresponds to the coded offsets of the plurality of secondary blocks, respectively.

12. The system of claim 9, wherein the processor is further configured to store a new data file in the freed at least one storage location in the storage service where at least one of the main block and the plurality of secondary blocks was previous stored.

13. The system of claim 9, wherein, after the marking of the main block of the data file and before the deleting of the plurality of secondary blocks, the processor is further configured to create copies of the main block and the plurality of secondary blocks of the data file and saving the created copies as a new main block and new plurality of second blocks in another first bucket and another at least one second bucket, respectively, of the storage service.

14. The system of claim 13, wherein the processor is configured to lock the main block before creating copies of the main block and the plurality of secondary blocks by:
  accessing the metadata of the main block of the data file;
  deserializing the accessed metadata; and
  refreshing the metadata of the main block of the data file with the refreshed metadata including a data identifier that indicates a lock type and a lock time expiration.

15. The system of claim 9, wherein the processor is further configured to write a plurality of zeroes in a data buffer of a client computer that correspond to a position of the deleted data file the client computer attempts to perform a read operation of the data file.

16. The system of claim 9, wherein the first and second buckets comprise roots of object namespaces that are associated with a client computer using the storage service.

17. A non-transitory computer readable medium storing computer executable instructions for managing electronic data stored in a storage service, including instructions for:
  storing, in the storage service, a plurality of data objects that correspond to a main block and a plurality of secondary blocks of a data file, wherein the main block is stored in a first bucket and has a name being a file name of the data file and the plurality of secondary blocks are stored in at least one second bucket, wherein the main block includes metadata indicating a unique identifier of the at least one second bucket and each secondary block contains a portion of the electronic data of the data file;

receiving, by the storage service, a request to delete the data file to free at least one storage location including the first bucket and the at least one second bucket;

based on the request to delete the data file, marking the main block of the data file for deletion by providing an indicator in the metadata of the main block that prevents at least one of a reading operation of the data file and a writing operation of additional data to the data file;

deleting the plurality of secondary blocks of the data file from the at least one second bucket; and after the plurality of secondary blocks are deleted, deleting the marked main block of the data file from the first bucket, such that the at least one storage location is free to store a new data file.

18. The non-transitory computer readable medium of claim 17, wherein the plurality of secondary blocks comprise names containing coded offsets relative to a start of the data file.

19. The non-transitory computer readable medium of claim 18, wherein the metadata included in the main block indicating the unique identifier corresponds to the coded offsets of the plurality of secondary blocks, respectively.

20. The non-transitory computer readable medium of claim 17, further including instructions for storing a new data file in the freed at least one storage location in the storage service where at least one of the main block and the plurality of secondary blocks was previous stored.

21. The non-transitory computer readable medium of claim 17, further including instructions for, after the marking of the main block of the data file and before the deleting of the plurality of secondary blocks, creating copies of the main block and the plurality of secondary blocks of the data file and saving the created copies as a new main block and new plurality of second blocks in another first bucket and another at least one second bucket, respectively, of the storage service.

22. The non-transitory computer readable medium of claim 21, wherein the instructions for marking the main block for deletion further comprise instructions for locking the main block by:
   accessing the metadata of the main block of the data file;
   deserializing the accessed metadata; and
   refreshing the metadata of the main block of the data file with the refreshed metadata including a data identifier that indicates a lock type and a lock time expiration.

23. The non-transitory computer readable medium of claim 17, further comprising instructions for writing a plurality of zeroes in a data buffer of a client computer that correspond to a position of the deleted data file the client computer attempts to perform a read operation of the data file.

24. The non-transitory computer readable medium of claim 17, wherein the first and second buckets comprise roots of object namespaces that are associated with a client computer using the storage service.

* * * * *